United States Patent [19]
Badenkov et al.

[11] 3,982,989
[45] Sept. 28, 1976

[54] APPARATUS FOR FEEDING AND SETTING BEADS ONTO THE ASSEMBLY DRUM OF A MACHINE FOR ASSEMBLING PNEUMATIC TIRES

[76] Inventors: Petr Fedorovich Badenkov, prospekt Mira, 112, kv. 234; Gennady Lazarevich Portny, 2 Kabelnaya, 10, kv. 64; Igor Mikhailovich Muslaev, ulitsa Junykh Lenintsev, 66, kv. 38; Regina Lazarevna Pukhova, 15 Parkovaya, 53, korpus 2, kv. 72; Isaak Shlemovich Roitburd, Scherbakovskaya ulitsa, 20/24, kv. 85; Natalya Vasilievna Ljubartovich, Shosse Entuziastov, 156, kv. 99; Valery Donovich Rossin, Studgorod MIFI, 8, kv. 21; Leonid Venediktovich Petrokas, 9 ulitsa Sokolinoi gory, 3, kv. 248; Nikolai Sergeevich Tsaplin, 2 Schipovsky pereulok, 8, kv. 55, all of Moscow, U.S.S.R.

[22] Filed: Oct. 25, 1974

[21] Appl. No.: 518,145

[52] U.S. Cl. .............................. 156/403; 156/131
[51] Int. Cl.² ...................................... B29H 17/12
[58] Field of Search ........... 156/403, 398, 399, 401, 156/402, 403, 131, 132, 135, 415, 417

[56] References Cited
UNITED STATES PATENTS

| | | | |
|---|---|---|---|
| 1,310,701 | 7/1919 | Hopkinson | 156/403 |
| 1,921,579 | 8/1933 | Otto | 156/403 |
| 2,754,886 | 7/1956 | Bishop | 156/403 X |
| 3,224,921 | 12/1965 | Frazier | 156/403 |
| 3,310,445 | 3/1967 | Nakane et al. | 156/403 X |
| 3,323,968 | 6/1967 | Black et al. | 156/396 X |
| 3,434,897 | 3/1969 | Caretta et al. | 156/403 |
| 3,556,900 | 1/1971 | Edney et al. | 156/403 |

FOREIGN PATENTS OR APPLICATIONS

| | | | |
|---|---|---|---|
| 45-23412 | 8/1970 | Japan | 156/398 |
| 1,074,138 | 6/1967 | United Kingdom | 156/403 |

*Primary Examiner*—Douglas J. Drummond
*Assistant Examiner*—John E. Kittle
*Attorney, Agent, or Firm*—Haseltine, Lake & Waters

[57] ABSTRACT

An apparatus for feeding and setting beads onto an assembly drum of a pneumatic tire assembling machine, comprising a bead servicing mechanism to support thereon a supply of beads, and a bead separating mechanism to effect successive transfer of the beads from the servicing mechanism to the assembly drum. The servicing mechanism comprises a plurality of parallel rods arranged in a single circle, the rods being provided with vanes uniformly spaced longitudinally of the rods. The latter are associated with a drive effecting rotation of the rods about; their axes between a position whereat the vanes are projected beyond the circle to separate the beads from one another, and a position whereat the vanes are retracted into said circle, providing for forwarding of the beads longitudinally of the rods.

9 Claims, 11 Drawing Figures

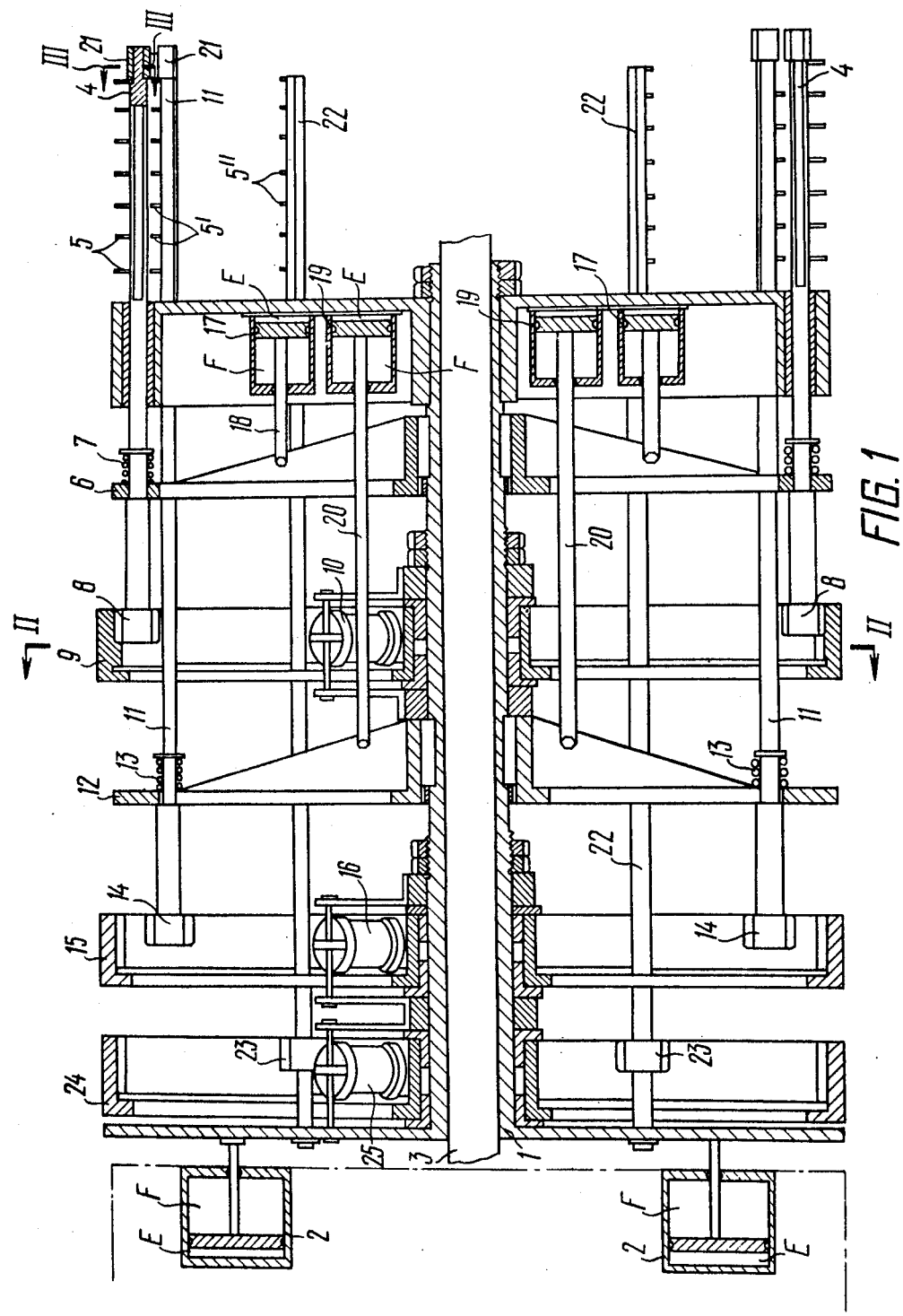

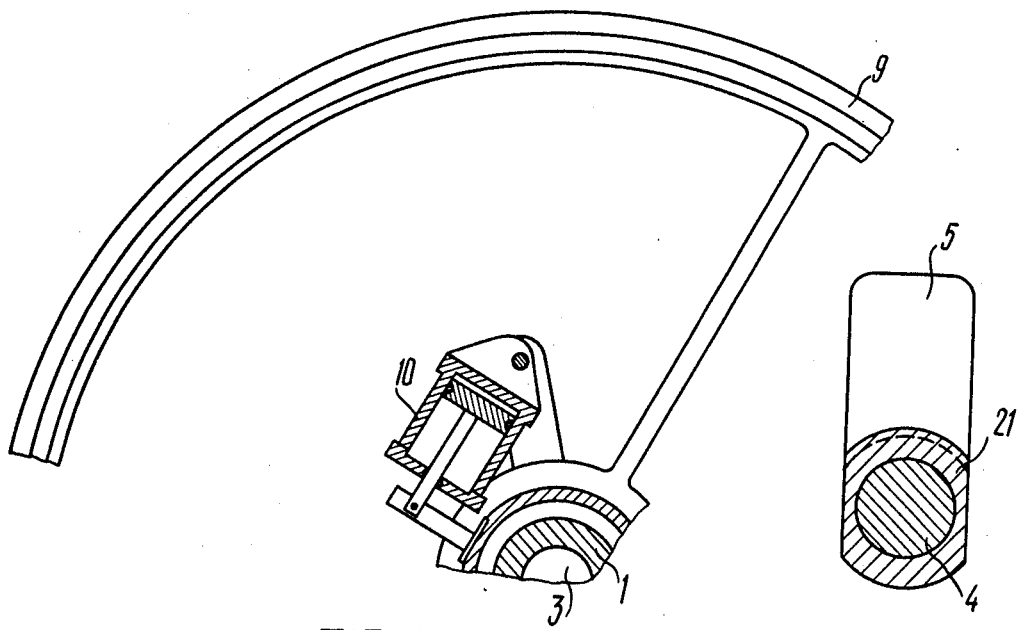

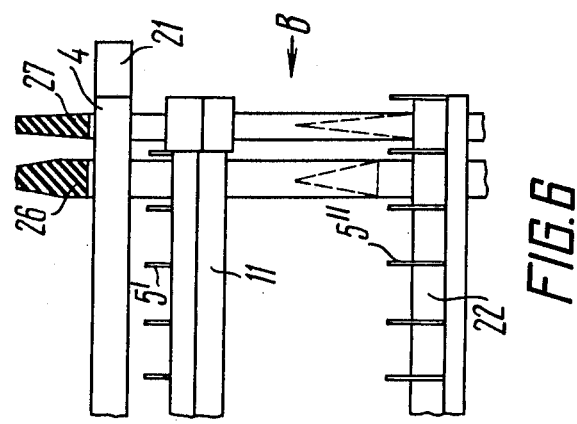
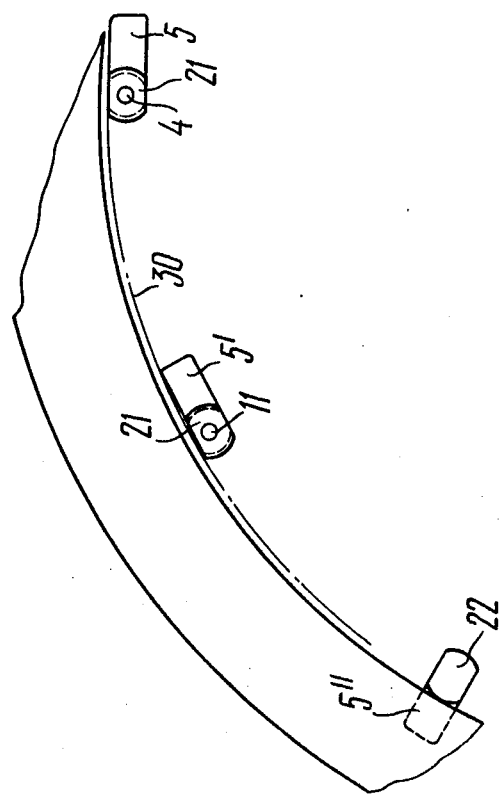

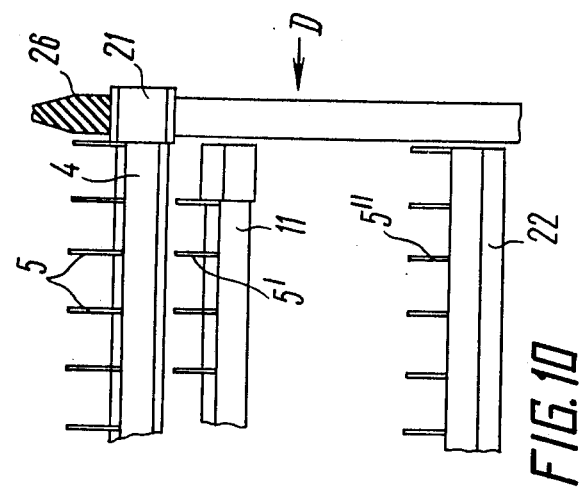
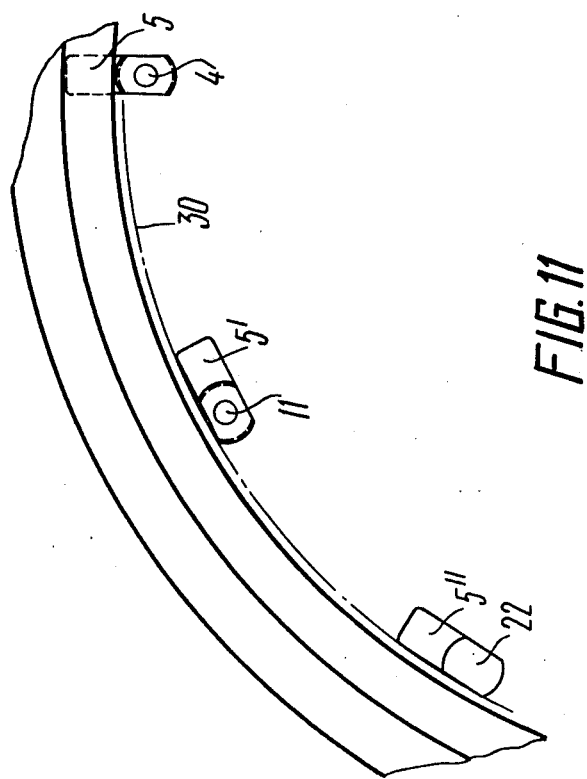

APPARATUS FOR FEEDING AND SETTING BEADS ONTO THE ASSEMBLY DRUM OF A MACHINE FOR ASSEMBLING PNEUMATIC TIRES

The invention relates to equipment for producing pneumatic tires and, more particularly, it relates to an apparatus for feeding and setting beads onto an assembly drum of a pneumatic tire assembling machine.

There is known an apparatus for feeding or servicing beads to the assembly drum of a pneumatic tire assembling machine (cf. Japanese Patent No. 23,412), including a bead servicer comprising a pair of cylindrical bead storage barrels supporting thereon a supply of beads and a central drum. The storage barrels are mounted coaxially at both sides of the central drum and are provided with means for effecting stepwise motion of the beads along the surfaces of the respective barrels. The known apparatus further includes a bead separator adapted to separate the endmost beads facing the central drum from the rest of the beads supported about the respective barrels and to transfer the separated beads in a piecewise fashion to the central drum. The bead separator includes separating blades associated with a drive effecting radial motion of these blades.

The known apparatus further comprises a drive effecting reciprocation of the central drum both vertically and horizontally.

The means effecting stepwise motion of the beads move the supply of the beads along the surfaces of the respective bead storage barrels toward the central drum. The separating blades separate the endmost beads from the rest of the beads, whereafter the separated beads are fed to the central drum. As the latter is reciprocated, it carries the beads seated on both ends thereof toward the working station of a tire assembler, whereafter the beads are set onto the tire assembly drum by an additional mechanism.

The above-described known bead feeding apparatus provides for accumulation of beads at the working station of a tire assembler and for automatic separation of the beads; however, it calls for incorporation of an additional mechanism for setting the beads, which complicates the operation of feeding and setting beads from the points of view of design and technology.

A disadvantage of the above-described known apparatus further arises from the fact that as the beads are separated by the bead separator in the form of radially expandable blades, the latter may harm the surfaces of the beads.

There is also known an apparatus devoid of the above disadvantages (cf. U.S. Pat. No. 3,323,968). This known bead servicing and setting apparatus for setting the beads onto the assembly drum of a pneumatic tire assembling machine includes a bead servicer for placing a supply of beads, a bead separator effecting successive forwarding of the beads from the servicer to the assembly drum and a bead setter effecting setting of the beads onto the assembly drum.

The servicer i.e. the bead servicing apparatus is in the form of parallel circumferentially arranged rods, associated with a pusher forwarding the beads along the rods of the bead servicing apparatus and a stationary support having mounted thereon a rotatable frame with two cylindrical bead storage barrels, each barrel being adapted to support thereon a supply of beads. These bead storage barrels are mounted on the rotatable frame in such a way that as the frame is rotated with respect to the stationary support, each barrel may occupy either of two positions, viz. a bead receiving position whereat the bead storage barrel faces a bead supplying mechanism, and a bead transfer position whereat the bead storage barrel faces the bead separator.

Each barrel is provided with a leverage effecting stepwise motion of the beads axially of the cylindrical surface of this storage barrel. To effect successive separation of the beads supported about the storage barrel, the latter is provided with an arm positioned interiorly thereof and actuated for radial motion and rotation.

The bead separating mechanism effecting successive transfer of the beads from the bead servicer to the tire assembly drum includes a support positioned intermediate of the bead servicer and the mechanism setting the beads onto the assembly drum, this support having mounted thereon a horizontal shaft. A transfer arm is mounted on this horizontal shaft for displacement longitudinally thereof. The horizontal arm is associated with a mechanism effecting rotation of this arm, in which manner there is effected displacement of the transfer arm between a position whereat the arm faces the bead servicer for cooperation with a bead on the storage barrel, and a position whereat the arm faces the mechanism setting the beads onto the tire assembly drum.

The mechanism setting the beads onto the assembly drum includes means for gripping the bead externally and means for gripping the bead internally, each means including an array of circumferentially arranged fingers mounted for radial displacement, in which manner there is effected gripping of the bead and setting thereof onto the assembly drum onto which tire carcass plies had been already placed after the drum has been brought adjacent to the bead setting mechanism.

The operation of the above-mentioned known apparatus for feeding beads and setting them onto a tire assembly drum is as follows. Beads are placed onto the rods of the bead servicing mechanism, whereafter one of the storage barrels is brought by rotation of the frame toward the bead servicing mechanism, and the pushers forward the beads along the rods of the bead servicing mechanism toward the storage barrel. The leverage effects transfer of a group of beads from the bead servicing mechanism onto the storage barrel. After this operation of transfer of the beads from the bead servicing mechanism onto the bead storage barrel, the rotatable frame is rotated relative to the stationary support, and the storage barrel with the supply of beads thereon is brought into the position of bead transfer to the assembly drum.

Each individual successive bead from the storage barrel supply is forwarded by the arm positioned internally of the barrel to the transfer arm of the bead separator which carries this bead to the mechanism setting the bead onto the assembly drum, whereafter the bead is gripped by the fingers of the external gripping means, the assembly drum is brought adjacent to the bead setting mechanism, and the cooperating fingers of the internal gripping means and internally gripping means set the bead onto the assembly drum.

The last-described known apparatus effects servicing of the beads to the tire assembly drum, as well as setting of the beads onto this assembly drum, the beads being saved from deformation by the bead separating mechanism, as they are transferred from the storage barrel to the bead setting mechanism; however deformation of the beads might occur, as the beads are forwarded along the surface of the storage barrels and along the rods of the bead servicing mechanism. As the beads are being thus forwarded, adjacent beads might adhere to one another, and in this case separation of these beads might result in their deformation. A disadvantage of this known apparatus is also the complexity of the operation of transfer of the beads from the bead servicer to the tire assembly drum.

It is an object of the present invention to provide an apparatus for feeding and setting beads onto the assembly drum of a pneumatic tire assembling machine, which is simple both in structure and in operation.

It is another object of the present invention to create such an apparatus, wherein sticking of the beads and deformation thereof is positively prevented.

It is still another object of the present invention to create an apparatus wherein friction of the rubber beads against the metal surfaces of the bead servicing mechanism is prevented.

It is yet another object of the present invention to provide an apparatus which is capable of setting both main and auxiliary beads having different diameters.

These and other objects are attained in the inventive apparatus for feeding and setting beads onto the assembly drum of a pneumatic tire assembling machine, comprising a bead servicing mechanism adapted to support thereon a supply of beads and a bead separating mechanism effecting successive forwarding of the beads from the servicing mechanism to the assembly drum, in which apparatus, in accordance with the present invention. The bead servicing mechanism includes a plurality of parallel rods arranged in a single circle, the rods being provided each with a plurality of vanes uniformly spaced longitudinally of the rods and adapted to separate from one another the beads accommodated by the bead servicing mechanism, the rods being associated with drive means effecting rotation of the rods; about their respective axes, whereby the vanes are moved between a position whereat they project beyond the circle defined by the rods, to separate the beads from one another, and a position whereat the vanes lie within the last-mentioned circle, in which position the beads are released for motion longitudinally of the rods.

It is further advisable that the bead separating mechanism include a plurality of second rods alternating with the first-named rods of the bead servicing mechanism and arranged in the same circle, each second rod being provided with a plurality of vanes spaced longitudinally of the rod, the spacing being the same as that of the first-named vanes the second rods being associated with a drive effecting radially inward advancement of these rods, independently of the movement on of the first rods. Thus the last-mentioned vanes are moved between a position whereat they project beyond the circle and another position whereat the vanes lie within this circle, releasing the beads for motion longitudinally of the rods. The rods of the servicing and separating mechanisms are both associated with a drive effecting relative movement of the two kinds of rods with respect to each other.

The first rods of the bead servicing mechanism, may form two groups alternating about the circle, the drive effecting the movement of these rods, including in this case a pair of independent drive means for the two groups of rods, the two groups being further associated with other drive means that effect longitudinal movement of one group of rods relative to the other group.

The drives effecting oscillation, respectively, of the rods of the servicing mechanism and of the rods of the separating mechanism may include pinions mounted on the ends of the rods and meshing with respective common driven gears for each one of the two groups of the rods.

It is advisable that at least some rods are spring-urged in the axial direction.

It is also advisable that both or some rods are cylindrical in cross-section and have longitudinally extending flats, the vanes being mounted on the cylindrical parts of the peripheries of the vanes, which feature provides for a reduction of the diameter of the circle defined by the rods, as the vanes are positioned interiorly of this circle.

The ends of some rods may have mounted thereon end-caps effecting centering of the beads.

The disclosed device is of a simple structure and simple in operation. The beads being forwarded do not stick together because they are separated by the vanes throughout the entire length of the rods; neither are the beads subjected to deformation. Prior to their setting, the beads are centered, which steps up the quality of the tire assembling operation. The apparatus is capable of setting both main and auxiliary beads.

Another advantage offered by the herein disclosed apparatus is the fact that in this apparatus friction of the beads against the metal surfaces of the bead servicing mechanism is prevented because in this apparatus forwarding of the beads by the servicing mechanism is effected by relative displacement of the groups of rods of the servicing mechanism, supporting the beads thereon, and of the separating mechanism.

The present invention will be further described in connection with an exemplary embodiment thereof, reference being had to the appended drawings, wherein:

FIG. 1 is a longitudinally sectional view of the apparatus for feeding and setting beads onto the assembly drum of a pneumatic tire assembling machine, in accordance with the invention;

FIG. 2 is a partly sectional view along line II—II of FIG. 1;

FIG. 3 is an enlarged sectional view along line III—III of FIG. 1;

FIG. 6 shows the rods of the servicer and of the separator in a position preceding the setting of an auxiliary bead, in accordance with the invention;

FIG. 7 is a view along arrow line B in FIG. 5;

FIG. 10 shows both rods of the bead servicer and in a position preceding the main bead setting position, in accordance with the invention and;

FIG. 11 is a view along arrow line D in FIG. 10.

Figure 4:
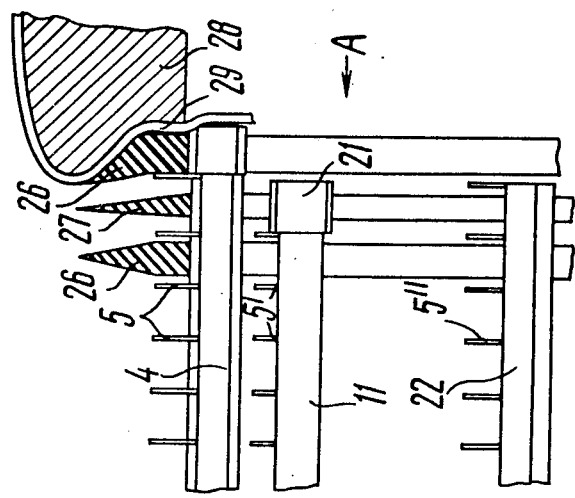
FIG. 4 shows the rods of the bead servicer and of the bead separator in a main bead setting position, in accordance with the invention.

Referring now to the appended drawings, the inventive apparatus for feeding and setting beads onto the assembly drum of a pneumatic tire assembling machine includes a housing 1 (FIG. 1) reciprocable by air cylinders 2 and mounted on a shaft 3 which is either an independent shaft or a shaft belonging to a pneumatic tire assembling machine.

The housing 1 supports a bead servicing mechanism including a group of rods 4. These rods are arranged in a circle and are parallel to one another. The rods 4 have secured thereto vanes 5 intended to separate from one another the beads supported on the rods 4. The spacing of the vanes 5 is determined by the width of a bead and is uniform throughout the entire length of the rods 4. The latter are mounted in a carrier 6 and are spring-urged in the axial direction relative to the carrier 6 by springs 7.

The rods 4 are associated with drive means effecting rotation of these rods about their; respective axes, the drive means including a pinion 8 mounted on each rod 4 and meshing with a common internally toothed gear 9 associated with a drive effecting rotation of this gear. The drive effecting rotation of the internally toothed gear 9 includes an air cylinder 10 (FIGS. 1 and 2).

The herein disclosed apparatus is capable of setting both main and auxiliary beads. To effect the latter, the bead servicing mechanism additionally includes, apart of the rods 4, another group of rods 11 (FIG. 1). These rods are arranged in the same circle as the rods 4 and extend parallel to one another, the rods 4 alternating in this circle with the rods 11. The rods likewise have secured thereto vanes 5' intended to separate the beads from one another, the vanes 5' being uniformly spaced longitudinally of the rods 11, the spacing corresponding to the width of a bead. The rods 11 are mounted in a carrier 12 and are spring-urged relative to this carrier 12 in the axial direction by springs 13.

Drive means effecting movement of the rods 11 about their axes, in a manner similar to that described for the rods 4, include a pinion 14 mounted on each rod 11 and meshing with a common internally toothed gear 15. The latter is rotated in operation by an air cylinder 16.

The group of rods 4 and 11 are mounted for independent longitudinal reciprocation relative to one another. This is made possible by the group of rods 4 being associated with air cylinders 17 of which plunger rods are connected to the carrier 6, while the group of rods 11 is associated with air cylinders 19 of which plunger rods are connected to the carrier 12.

The ends of the rods 4 and 11 have mounted thereon end caps 21 (FIGS. 1 and 3) intended to effect the centering of each bead prior to setting thereof, relative to the shoulders of the assembly drum. The end caps 21, on the rods 4 and rods 11 (FIG. 1) may be of different diameters, which makes the herein disclosed apparatus capable of feeding and setting main and auxiliary beads having different diameters.

The apparatus further includes a bead separating mechanism effecting successive forwarding of the beads from the bead servicer to the assembly drum. The bead separating mechanism likewise includes a group of rods 22 extending intermediate of the rods 4 and 11 of the bead servicing mechanism parallel to one another, in the same circle with the rods 4 and 11.

The rods 22 have secured thereto vanes 5'' uniformly spaced longitudinally of the rods, the spacing being equal to that of the vanes 5, 5', respectively, along the rods 4 and 11 of the bead servicer. The rods 22 are journalled in the housing 1.

Drive means effecting the described movement of the rods 22 about their respective axes include a pinion 23 mounted on each rod 22 and meshing with a common internally toothed gear 24. The latter is rotated in operation through a predetermined angle by an air cylinder 25.

The group of the rods 22 is longitudinally reciprocable relative to the rods 4 and 11 by means of the air cylinders 2.

In the described preferred embodiment of the present invention the rods 4, 11 and 22 are cylindrical and have longitudinally extending flats throughout their cylindrical peripheral surfaces, the vanes 5, 5' and 5'' being mounted on the cylindrical parts of the peripheries of the respective rods 4, 11 and 22, as can be seen in FIG. 3. Owing to this feature, when the rods 4, 11 and 22 (FIG. 1) are rotated into a position whereat their respective vanes extend internally of the circle defined by the arrangement of the rods, the diameter of this circle is reduced owing to the flats, to prevent friction of the rubber surfaces of the beads against the metal surfaces of the rods 4, 11 and 22, as the rods 4 and 11 of the bead servicer are reciprocated longitudinally relative to the rods 22 of the bead separator.

The herein disclosed apparatus for feeding and setting beads onto the assembly drum of a pneumatic tire assembling machine operates as follows. Let us consider the operation of the apparatus when it is employed for feeding and setting a main bead and an auxiliary bead, as is the case when radial-ply tires for lorries are assembled. The apparatus has supplied thereupon in advance main beads 26 (FIG. 4) and auxiliary beads 27 which are supported thereon in an alternating fashion, viz. a main bead 26, a vane 5, an auxiliary bead 27, a vane 5, and so on.

Compressed air is fed into the spaces E of the air cylinders 2 (FIG. 1), and the apparatus is advanced bodily along the shaft 3 toward an assembly drum 28 (FIG. 4). Setting of the main bed 26 is effected upon an shoulders of the assembly drum 28 onto which radial plies of cord 29 have been put in advance. The setting is effected with the group of rods 4 supporting the main bead 26 on the end portions thereof, having been brought to rest against the assembly drum 28, whereafter the rods 4 compress the spring 7 (FIG. 1) and move as if a way from the assembly drum relative to the rest of the apparatus.

Figure 5:
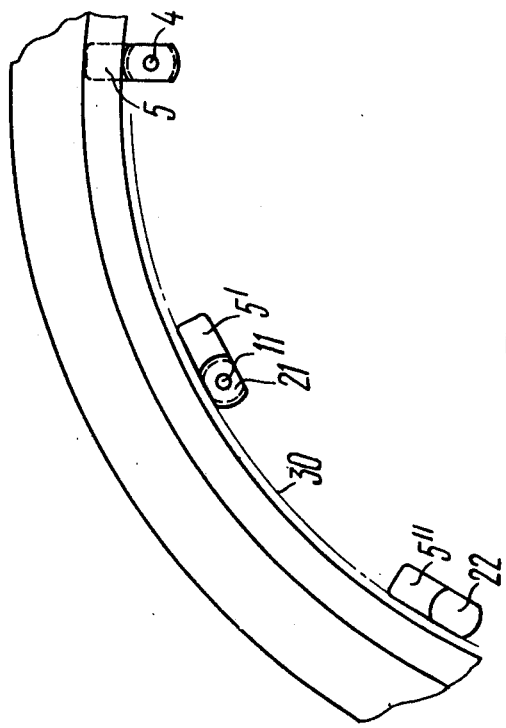
FIG. 5 is a view along arrow line A in FIG. 4.

At this position the vanes 5 of the rods 4 separate the beads, while the vanes 5 and 5'', respectively, of the rods 11 and 12 are retracted into the circle formed by the rods, as can be seen in FIG. 5. The operation of setting the main bead 26 is herewith completed.

The apparatus is bodily advanced into its extreme lefthand position (i.e., into the position remote from the assembly drum 28 in the appended drawings) by the spaces E (FIG. 1) of the air cylinders 2 being connected to atmosphere and by compressed air being fed into the spaces F of these cylinders. Simultaneously, the spring 7 returns the rods 4 into their initial position.

Thereafter the apparatus is prepared for setting the auxiliary bead 27 (FIG. 6). This is done by feeding compressed air into the air cylinder 25 (FIG. 1), whereby the internally toothed gear 24 is rotated through a predetermined angle, its rotation being transmitted through the pinions 23 to the rods 22.

Thus, the rods 22 rotate about their respective axes so that the vanes 5'' thereof are projected beyond the circle 30 formed by the arrangement of the rods 22, 4 and 11 (as is shown in FIG. 7) to separate the main beads 26 from the auxiliary beads 27. Then compressed air is fed into the air cylinder 10 (FIG. 1), and the internally toothed gear 9 is rotated through a predetermined angle, whereby the rods 4 are rotated about their respective axes so that their vanes 5 are retracted into the circle 30, as is shown in FIG. 7.

Simultaneously, air is fed into the air cylinder 16 (FIG. 1) to rotate the internally toothed gear 15 through a predetermined angle. Consequently, the vanes 5' of the group of rods 11 intended for setting the auxiliary beads 27 (FIG. 8) are projected beyond the circle 30 (FIG. 9), separating the beads, while the vanes 5" of the rods 22 are once again retracted into the circle 30 by means of the air cylinder 25, internally toothed gear 24 and pinions 23.

Figure 8:
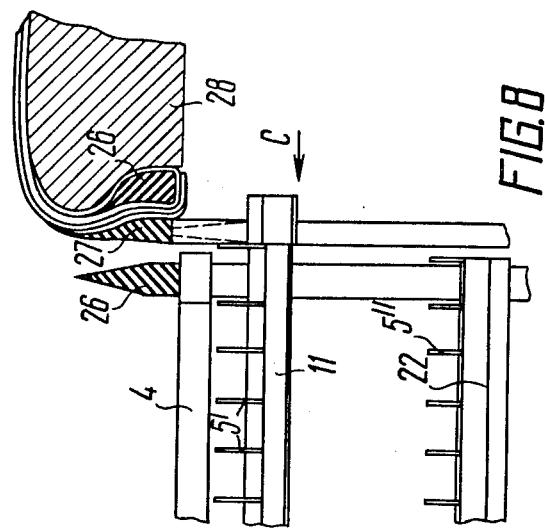
FIG. 8 shows both rods in a position of setting the auxiliary bead, in accordance with the invention.

This done, compressed air is supplied into the space F (FIG. 1) of the air cylinder 19, and the carrier 12 with the auxiliary beads 27 (FIG. 8) supported on the end portions of the rods 11 is advanced toward the assembly drum 28. Simultaneously, compressed air is fed into the space E of the air cylinder 17 (FIG. 1), and the carrier 6 with the rods 4 moves to the left, as is shown in FIG. 8. Thus, the auxiliary bead 27 is brought into the endmost right-hand position, facing the assembly drum 28. Now the apparatus has been prepared for setting the auxiliary bead 27.

The stroke of reciprocation of the rods 4 and 11 equals the spacing between the adjacent pairs of vanes 5 and 5'.

Figure 9:
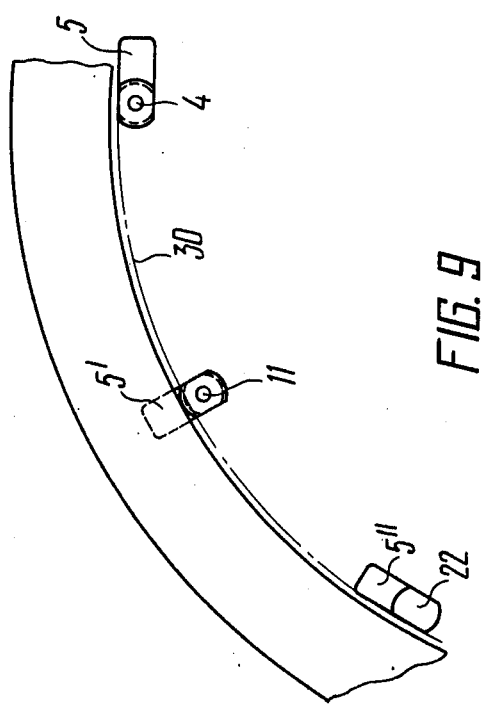
FIG. 9 is a view along arrow line C in FIG. 7.

Reciprocation of the rods 4 and 11 longitudinally of the shaft 3 (FIG. 1), with the rods carrying the beads thereon, is facilitated by the rods 4, 11 and 22 having the above-described shape ensuring that, when the rods are rotated about their axes to retract their respective vanes into the circle defined by the rods, the diameter of this bead-supporting circle 30 is reduced, as can be seen, for example, in FIG. 9.

The next operation is setting the auxiliary bead 27 (FIG. 8) onto the shoulders of the assembly drum 28. This is effected by feeding compressed air into the spaces E of the air cylinders 2 (FIG. 1), and the entire apparatus is bodily advanced to the right along the shaft 3.

Setting of the auxiliary bead 27 (FIG. 8) is effected similarly to the above-described operation of setting the main bead 26. The setting completed, the apparatus is bodily retracted into its endmost left-hand position by the spaces E (FIG. 1 of the air cylinders 2 being connected to atmosphere, and compressed air being fed into the spaces F. Simultaneously, the group of rods 11 is returned into the initial position by the spring 13, and the apparatus occupies a position illustrated in FIGS. 10 and 11, i.e. the position of preparation for setting a main bead 26.

The end caps 21 mounted on the ends of the rods 4 and 11 provide for centering of the respective beads prior to their setting.

The above-described operating cycle of the apparatus can now be repeated, making the same continuous with the next line 11.

The apparatus has a supply of main and auxiliary beads fed thereupon in the sequence of operations that is opposite to the one described hereinabove. Should the apparatus be used for servicing and setting beads of one size only, the operation is similar to the one described hereinabove in connection with setting of the main bead. Thus, in this case forwarding of the beads along the servicer and setting of the beads is effected merely by cooperation of the rods 4 of the bead servicer with the rods 22 of the bead separator.

What we claim is:

1. An apparatus for feeding and setting beads onto an assembly drum of a machine for assembling pneumatic tires, comprising: at least one first group of rods which extend substantially parallel to one another and are arranged in a single circle for supporting thereon a supply of the beads; at least one first group of vanes mounted on said first group of rods, uniformly spaced longitudinally of said rods, for separating said beads from one another; at least one first drive to effect the rotation of each individual rod about its own longitudinal axis, between a first position whereat said first vanes are projected beyond said circle to separate the beads from one another, and a second position whereat said first vanes are retracted into said circle, providing for forwarding of the beads longitudinally of said first group of rods; and a bead separating mechanism effecting incremental advancement of the bead rings along said first group of rods from the latter to the assembly drum.

2. The apparatus as defined in claim 1, wherein said rods of the at least one first group, and constitute a bead servicing mechanism.

3. The apparatus as defined in claim 1, further comprising a bead servicing mechanism for supporting thereon the supply of beads; and comprising two of said first group of rods that alternate about said circle, and two of said first drives for the rotation of said two first groups of rods.

4. The apparatus as defined in claim 1, wherein at least some of said rods are cylindrical and have longitudinal flats extending therealong, at least some of said vanes being mounted on cylindrical surfaces of said rods, whereby the effective circumference of said circle is reduced at said some are rotated to retract said some vanes within said circle, to help facilitate the forwarding of the beads longitudinally of said rods.

5. The apparatus as defined in claim 1, further comprising at least one second group of rods arranged intermediate of said first group of rods in said circle, parallel therewith and constituting said bead separating mechanism; at least one second group of vanes mounted on said second group of rods, uniformly spaced longitudinally of said second rods at the same spacing as that of said first vanes; a second drive to effect the rotation of each individual second rod about its longitudinal axis, whereby said second vanes are alternatingly projected beyond said circle, and retracted thereinto, providing for forwarding of the beads longitudinally of said second group of rods; and drive means to effect longitudinal movement of said second group of rods relative to said first group of rods.

6. The apparatus as defined in claim 5, wherein at least one of said drives includes pinions mounted on end portions of the respective ones of said rods, and a common gear meshing with said pinions.

7. The apparatus as defined in claim 5, wherein at least one of said groups of rods is axially spring-urged.

8. The apparatus as defined in claim 3, wherein at least some of said rods are cylindrical and have longitudinal flats extending therealong, at least some of said vanes being mounted on cylindrical surfaces of said rods, whereby the effective circumference of said circle is reduced as said some rods are rotated to retract said some vanes within said circle, to help facilitate the forwarding of the beads longitudinally of said rods.

9. The apparatus as defined in claim 5, further comprising bead-centering end caps for end portions of at least some of said rods.

* * * * *